(12) United States Patent
Pell et al.

(10) Patent No.: US 8,930,876 B2
(45) Date of Patent: Jan. 6, 2015

(54) METHOD OF DEBUGGING CONTROL FLOW IN A STREAM PROCESSOR

(71) Applicant: Maxeler Technologies, Ltd., London (GB)

(72) Inventors: Oliver Pell, London (GB); Itay Greenspon, London (GB); James Barry Spooner, London (GB); Robert Gwilym Dimond, London (GB)

(73) Assignee: Maxeler Technologies, Ltd., London (GB)

( * ) Notice: Subject to any disclaimer, the term of this patent is extended or adjusted under 35 U.S.C. 154(b) by 0 days.

(21) Appl. No.: 13/725,345

(22) Filed: Dec. 21, 2012

(65) Prior Publication Data

US 2013/0145070 A1 Jun. 6, 2013

Related U.S. Application Data

(63) Continuation of application No. 13/212,907, filed on Aug. 18, 2011.

(51) Int. Cl.
| | |
|---|---|
| *G06F 17/50* | (2006.01) |
| *G06F 11/22* | (2006.01) |
| *G06F 11/30* | (2006.01) |
| *G06F 13/36* | (2006.01) |
| *G06F 11/36* | (2006.01) |
| *G06F 15/76* | (2006.01) |

(52) U.S. Cl.
CPC ............ *G06F 15/76* (2013.01); *G06F 11/3024* (2013.01); *G06F 13/36* (2013.01); *G06F 11/3636* (2013.01); *G06F 11/3027* (2013.01); *G06F 11/3093* (2013.01)
USPC .......................................... 716/136; 716/117

(58) Field of Classification Search
CPC ............ G06F 17/5036; G06F 17/5022; G06F 17/5081; G06F 17/5045; G06F 17/5068; G06F 17/5054; G06F 17/5072
USPC ................................................... 716/136, 117
See application file for complete search history.

(56) References Cited

U.S. PATENT DOCUMENTS

| | | | |
|---|---|---|---|
| 7,536,669 B1 * | 5/2009 | Anderson | 716/138 |
| 8,464,190 B2 * | 6/2013 | Bower et al. | 716/106 |
| 2012/0200315 A1 * | 8/2012 | Dimond | 326/39 |

* cited by examiner

*Primary Examiner* — Thuan Do
*Assistant Examiner* — Magid Dimyan
(74) *Attorney, Agent, or Firm* — Conley Rose, P.C.

(57) ABSTRACT

Disclosed is a method of monitoring operation of programmable logic for a streaming processor, the method comprising: generating a graph representing the programmable logic to be implemented in hardware, the graph comprising nodes and edges connecting nodes in the graph; inserting, on each edge, monitoring hardware to monitor flow of data along the edge. Also disclosed is a method of monitoring operation of programmable logic for a streaming processor, the method comprising: generating a graph representing the programmable logic to be implemented in hardware, the graph comprising nodes and edges connecting the nodes in the graph; inserting, on at least one edge, data-generating hardware arranged to receive data from an upstream node and generate data at known values having the same flow control pattern as the received data for onward transmission to a connected node.

15 Claims, 23 Drawing Sheets

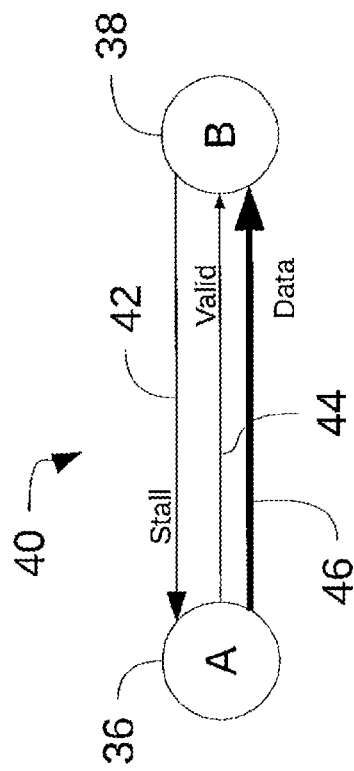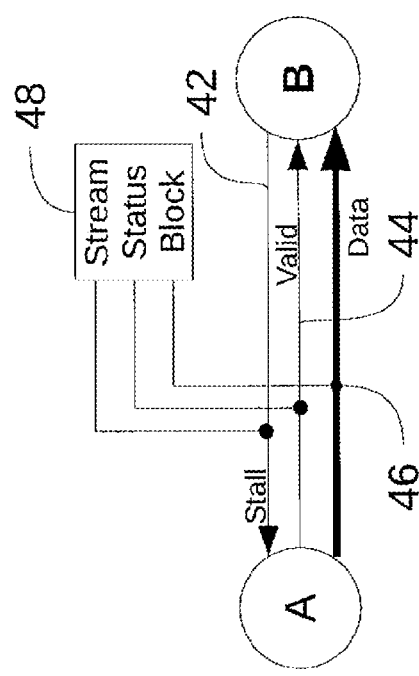

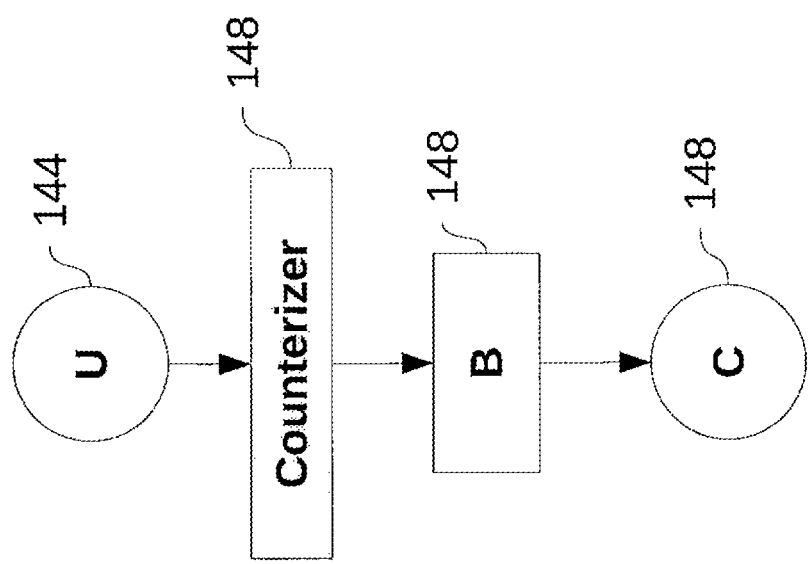

METHOD OF DEBUGGING CONTROL FLOW IN A STREAM PROCESSOR

CROSS-REFERENCE TO RELATED APPLICATIONS

This application is a continuation under 35 U.S.C. §120 of pending U.S. patent application No. 13/212,907, filed Aug.18, 2011, entitled "Methods of Monitoring Operation of Programmable Logic," the disclosure of which is hereby incorporated herein by reference in its entirety.

STATEMENT REGARDING FEDERALLY SPONSORED RESEARCH OR DEVELOPMENT

Not applicable.

The present invention relates to methods of monitoring operation of programmable logic as may be used, for example, in a process of debugging a streaming processor. In examples, the invention relates to a method for monitoring operation, and optionally then debugging, a field programmable gate array (FPGA).

Typically, a streaming processor such as might be provided by the assignee, Maxeler Technologies Ltd., consists of an FPGA, connected to multiple memories or other external data sources/sinks On the FPGA, the circuit is made up of a manager containing one or more blocks including kernels. Typically the streaming processor may be used as a hardware accelerator for certain computing applications.

Kernels are hardware data-paths implementing the arithmetic and logical computations needed within an algorithm. A "manager" is the collective term for the FPGA logic which orchestrates or controls data flow between Kernels and off-chip input/output (I/O) in the form of streams. By using a streaming model for off-chip I/O to the associated external components, e.g. PCI Express bus and DRAM memory, managers are able to achieve high utilization of available bandwidth in off-chip communication channels. A user, when designing or configuring an FPGA, controls the designs of the kernels and the configuration of the manager so as to ensure that the FPGA performs the desired processing steps on data passing through it.

Typically dataflow hardware accelerators implement a streaming model of computation in which computations are described structurally (computing in space) rather than specifying a sequence of processor instructions (computing in time). In this model of computation, a high-level language is used to generate a graph of operations. FIG. 1 shows a schematic representation of such a graph. The graph 2 comprises nodes 4, 6, 8 and 10 each node being a kernel within the streaming processor. Each node in the graph executes a specific function on incoming data and outputs the result, which becomes the input to another node in the graph. The data being processed "flows" through the graph from one node to the next, without requiring writing back to memory. This graph may then be implemented as an application-specific circuit within an FPGA accelerator. In this example, kernel 8 may be a multiplexer arranged to select one of the outputs from nodes 4 and 6 and provide this value to the kernel 10. It will be appreciated that the example of FIG. 1 is a simplified example of what such a streaming processor may typically look like. In practice such a graph is likely to have up to thousands or even more nodes with connecting edges. Thus, to map data flow and identify errors in the flow of data in such a large graph represents a significant technical problem.

Streaming accelerators implemented using FPGAs or other similar processing technology, can offer increased performance on many useful applications compared to conventional microprocessors. See for example our co-pending applications, U.S. Ser. No. 12/636,906, U.S. Ser. No. 12/792,197, U.S. Ser. No. 12/823,432, U.S. Ser. No. 13/023,275 and U.S. Ser. No. 13/029,696, the entire contents of all of which are hereby incorporated by reference. In our co-pending application Ser. No. 13/166,565, the entire contents of which are hereby incorporated by reference, there is described a method for debugging the control flow on an FPGA.

Although streaming processors themselves are immensely useful for various types of computer applications, when constructing a streaming processor, problems can be encountered. One such problem is that there can be no visibility as to why a streaming processor fails to operate as expected. It is often very difficult to determine where investigations into such a failure should start. Indeed, it can be extremely difficult to find the source of data corruption only by observing the inputs and outputs of a streaming processor. For example, consider the graph shown in FIG. 2. The graph 2 represents a streaming processor with each of the nodes in the graph representing a kernel within the streaming processor. When streaming data in through nodes I1, I2 and I3, if the output node O does not produce any output data, it can be impossible to tell which upstream node is faulty.

According to a first aspect of the present disclosure, there is provided a method of monitoring operation of programmable logic for a streaming processor, the method comprising: generating a graph representing the programmable logic to be implemented in hardware, the graph comprising nodes and edges connecting nodes in the graph; and, inserting, on each edge, monitoring hardware to monitor flow of data along the edge.

The method provides a means by which hardware can be used to enable problems or faults within a streaming processor to be easily and quickly identified or diagnosed. Given the scale of current streaming processors the method provides a useful means by which faults can quickly and automatically be identified. Once found, such faults can be fixed or debugged in the usual way. Furthermore the method provides a way by which data can easily be collected about the operation of a streaming processor so that this gathered information can be used to reconstruct the state of the data flow graph at a given point in time. The graph may represent an entire stream processor as would be implemented on an FPGA. Alternatively, the graph may represent some subset of the features as would be included on the FPGA.

In one embodiment, each edge comprises flow control signals and a data bus for flow of data, and wherein the method comprises coupling the monitoring hardware to both the flow control signals and the data bus. By coupling the hardware to the flow control signals as well as to the data bus it possible to ensure that the hardware is aware of when data is passing on the data bus.

In one embodiment, the method comprises reading parameters associated with the data with the monitoring hardware, the parameters including the number of valid data cycles.

In one embodiment, the method comprises performing a checksum on passing data with the monitoring hardware.

In one embodiment, the method comprises performing a checksum on at least two consecutive edges and comparing the checksum values. By doing this it can be possible to check whether the node between the two edges is functioning correctly, in the particular case of a node which is not supposed to modify the data, e.g. a FIFO buffer. If the checksum varies, then clearly the data will have been modified and so the FIFO will not have functioned correctly.

In one embodiment, the method comprises determining the number of valid cycles along every edge in the graph thereby identifying one or more routes taken by data through the graph. This enables the route taken by data through the data flow graph to be easily determined.

In one embodiment, the method comprises determining the number of valid cycles along at least two consecutive edges and comparing the numbers. By comparing the number of valid cycles along two consecutive edges it is possible to establish whether or not data has been lost in a node in a manner that might not have been expected.

In one embodiment, at least one of the nodes comprises a FIFO memory.

In some situations, it is difficult to find the point in time relative to the beginning of a streaming processor where a failure occurred. For example, where a FIFO is swallowing data, i.e., not outputting the required amount of data, it is relatively straightforward to identify that there is a problem, e.g. by counting how much data comes out of the FIFO and comparing this to the amount of data that has gone in. However, it is extremely difficult to know which data items are missing. In particular, it would be desirable to know if the missing data is from the start, the end or the middle of the input data.

One further problem is that it is difficult to debug a problem when the data stream consists of unknown (or difficult to determine) values. Referring to FIG. 3, a kernel 12 is arranged to output data to storage 14. After the stream has completed, it would be possible to inspect the external data storage 14. However, without knowing exactly what data was written it would be very difficult to arrive at any conclusions.

2002/082269 relates to a system observation bus and provides a method and mechanism for configuring a node in a computing system to route data to a predetermined observation point. U.S. Pat. No. 6,678,861 relates to a FIFO with cyclic redundancy check (CRC) in a programmable logic device (PLD). A PLD is provided comprising one or more memory circuits configured to check a CRC value of an input and generate a CRC for an output. U.S. Pat. No. 7,543,216 relates to cyclic redundancy checking of a field programmable gate array having an SRAM memory architecture.

According to a second aspect of the present disclosure, there is provided a method of monitoring operation of programmable logic for a streaming processor, the method comprising: generating a graph representing the programmable logic to be implemented in hardware, the graph comprising nodes and edges connecting the nodes; inserting, on at least one edge, data-generating hardware arranged to receive data from an upstream node and generate data at known values having the same flow control pattern as the received data for onward transmission to a connected node.

Thus the actual data received by the data generating hardware is not passed on to the next connected node but rather dummy data having the same flow control pattern is passed on. In some cases the flow control pattern of data is important to determine operation of the streaming processor so that by emulating this pattern using dummy data, the effect of the flow control pattern on the streaming processor can effectively be isolated since the effect of the data itself is removed.

In an embodiment, the data-generating hardware is provided on each edge in the graph.

In an embodiment, the data-generating hardware is arranged to generate a count signal. In other words, the known values of data generated are simply a count which can be arranged to increment uniformly. This means that the effect on the data of the nodes is known and so if any differences are encountered between the expected output of the nodes and the actual outputs then it can easily be determined that there is some error with the node.

In an embodiment, each edge comprises a data bus for flow of data and flow control signals for the transmission of flow control signals, and wherein the method comprises coupling the data-generating hardware to both the flow control signals and the data bus.

In an embodiment the method comprises incrementing the counter when the flow control signals indicate that data should transfer between the nodes. Thus by connecting the data generating hardware to the flow control signals along the edge an easy way of ensuring that the flow control pattern is maintained is provided.

In an embodiment, the data-generating hardware is arranged to receive an input from the data bus and to provide as an output a count signal having the same flow control pattern as the data received on the data bus.

In an embodiment, the method comprises coupling the control signals to a data generator within the count-generating hardware, and in dependence on the flow control signals generating the count signal.

In an embodiment, the method comprises operating the data-generating hardware at the same clock rate as the data received from the upstream node.

According to a third aspect of the present disclosure, there is provided a streaming processor comprising: plural nodes for processing streaming data; at least one edge connecting the one or more nodes; monitoring hardware provided on each of the edges to monitor flow of data along the respective edge.

According to a fourth aspect of the present disclosure, there is provided a streaming processor comprising: plural nodes for processing streaming data; at least one edge connecting pairs of the one or more nodes; data-generating hardware arranged to receive data from an upstream node in a pair of nodes and generate data at known values having the same flow control pattern as the received data for onward transmission to a downstream node in the pair of nodes.

In an embodiment, the data-generating hardware comprises a data generator arranged to generate a count signal.

In an embodiment, the streaming processor is provided on an FPGA. It will be appreciated (and clear from the detailed description below) that the streaming processors of the above-mentioned third and fourth aspects of the present disclosure are preferably configured to be capable of performing the method including any features mentioned above as being provided "in an embodiment".

According to a further aspect of the present disclosure, there is provided a computer system comprising a processor and memory and a streaming processor, e.g. a hardware accelerator, according to the third or fourth aspects of the present disclosure.

According to a further aspect of the present disclosure, there is provided a method of monitoring operation of programmable logic for a streaming processor, the method comprising: generating a graph representing the programmable logic to be implemented in hardware, the graph comprising nodes and edges connecting the nodes, the edges including control signals and a data bus; inserting, on at least one edge monitoring hardware coupled to both the control signals and the data bus.

According to a further aspect of the present disclosure, there is provided a tool for enabling monitoring of the operation of programmable logic for a streaming processor, the tool comprising: a graph generator for generating a graph representing the programmable logic to be implemented in hardware, the graph comprising nodes and edges connecting nodes in the graph; a monitoring hardware generator, for generating monitoring hardware on each edge of the graph, the monitoring hardware being configured to monitor flow of data along the edge.

According to a further aspect of the present disclosure, there is provided a tool for monitoring operation of programmable logic for a streaming processor, the tool comprising: a graph generator for generating a graph representing the programmable logic to be implemented in hardware, the graph comprising nodes and edges connecting nodes in the graph; a hardware generator for generating and inserting, on at least one edge, data-generating hardware arranged to receive data from an upstream node and generate data at known values having the same flow control pattern as the received data, for onward transmission to a connected node.

In some examples, the tool may be used where the graph has been generated independently. In other words the tool would simply comprise the monitoring hardware generator and/or the hardware generator for generating and inserting the data-generating hardware. The tool may be software optionally provided on a computer-readable medium such as a disk or other form of memory.

BRIEF DESCRIPTION OF THE DRAWINGS

Embodiments of the present invention will now be described in detail with reference to the accompanying drawings, in which:

FIG. 5 is a schematic representation of a graph representing a streaming processor comprising 2 nodes and arranged to demonstrate the data and control connections between the nodes;

FIG. 6 is a schematic representation of the graph of FIG. 5 including a stream status block;

FIGS. 19, 20A and 20B show schematic representations of graphs representing streaming processors, including counterizers;

DETAILED DESCRIPTION OF DISCLOSED EMBODIMENTS

A method and apparatus is provided by which the problems discussed above are addressed. In particular within a streaming processor means to facilitate debugging of a streaming processor are provided. The means can include either or both of stream status blocks and counterizers. A stream status block is a piece of hardware provided between two kernels within a streaming processor. The stream status block is able to monitor the stream along the edge between two kernels and thereby provide information that enables debugging. A counterizer is, similarly hardware provided within a streaming processor. The counterizer provides a way of injecting known data into any point of the data flow graph while maintaining exact flow control patterns.

It will therefore be appreciated that stream status blocks and counterizer blocks, when used together form a debugging suite for hardware that processes data by implementing a data-flow graph.

Stream status blocks are a tool for debugging data flow, flow control and performance issues inside stream computers. They provide visibility into what essentially is a black box, and hence can dramatically shorten the time for finding problems that would otherwise take a very long time to figure out. In the case of a typical real-life streaming processor such as an FPGA, when represented as a graph in the manner described above the size of the graph is large. Therefore the use of stream status blocks and/or counterizers provides an efficient and simple means by which faults can be identified and therefore by which the processor or its design can be debugged.

Stream status blocks are designed to be a zero-effort (for the hardware designer) diagnostic tool, that can be enabled whenever visibility into the data flow graph is needed. Counterizer blocks provide a way of injecting known data into any point of the data flow graph while maintaining exact flow control patterns. Maintaining the same flow control patterns is crucial to reproducing problems. Having known data makes debugging much more efficient, as errors can easily be spotted and makes it possible to determine how the problem that is being solved affects the data.

A number of detailed but non-limiting examples of the use of stream status blocks and counterizers will now be described in detail. Stream status block can be used together with counterizers or the two can be used separately, i.e., one without the other.

Figure 4:
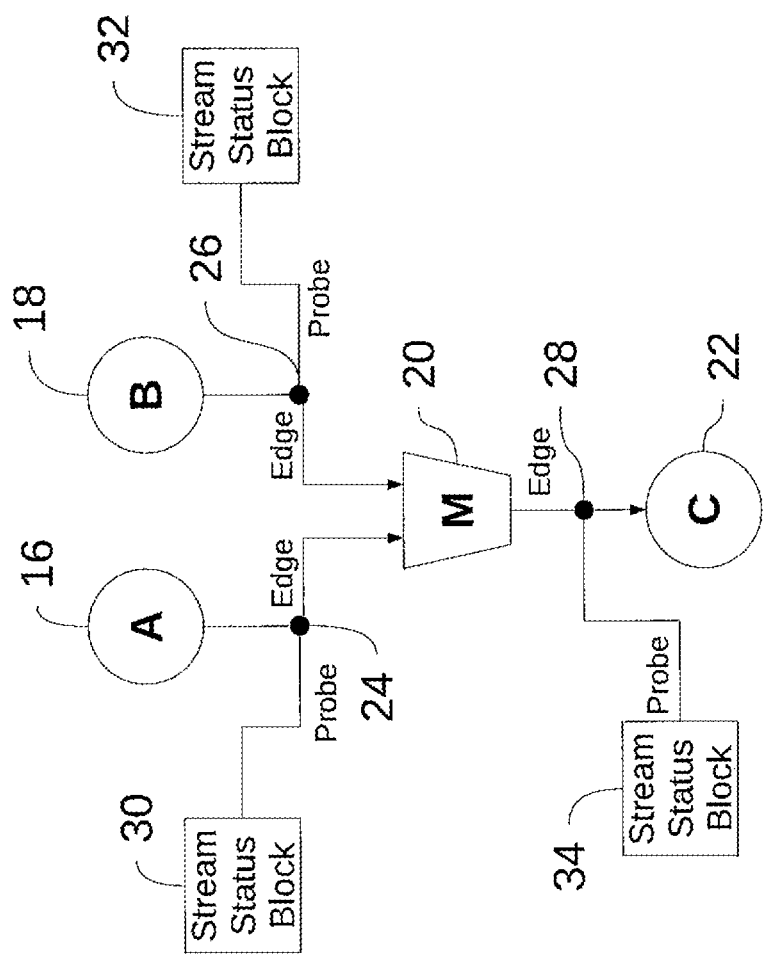
FIG. 4 is a schematic representation of a graph representing a streaming processor including stream status blocks.

FIG. 4 shows a schematic representation of a graph of a streaming processor including kernels 16, 18, 20 and 22. The precise role of the kernels in this example is not important.

However, kernel 20 is a multiplexer arranged to output the data received from either kernel 16 or kernel 18 on each clock cycle. It will be appreciated that each kernel is a "node" within the graph. For brevity and clarity in the description the nodes will simply be referred to as "kernels". The graph may represent an entire stream processor as would be implemented on an FPGA. Alternatively, the graph may represent some subset of the features as would be included on the FPGA.

Edges connect each of the kernels. A first edge 24 connects kernels 16 and 20. A second edge 26 connects kernels 18 and 20 and a third edge 28 connects kernels 20 and 22. Stream status blocks 30, 32 and 34 are provided. The stream status blocks serve to detect and register automatically flow control violations between the kernels and thereby provide the information required to reconstruct the state of the data flow graph at a given point in time. At a given point in time, a user is able to stop the stream and read back the values stored in the stream status blocks. From that information, the user is able to reconstruct the state of the data flow graph at that given point in time. The stream status blocks are within the manager of the stream processor.

Figure 7:
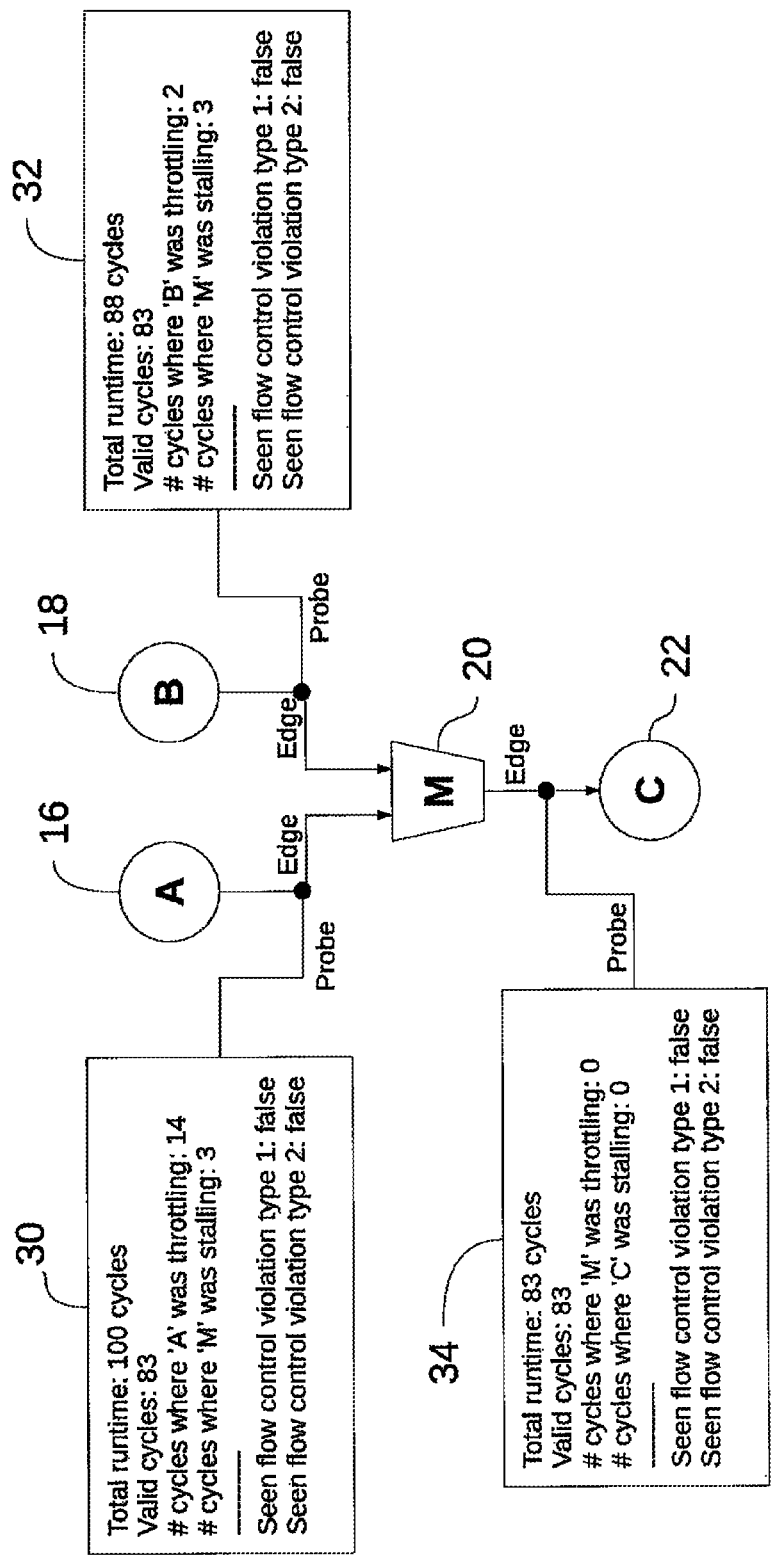
FIG. 7 is a schematic representation of the graph of FIG. 4 including detailed view of the output of stream status blocks.

FIG. 7 shows a reconstructed data flow graph corresponding to that of FIG. 4. As can be seen, the stream status blocks maintain counters and flow control violation flags that have been read out of the streaming processor. It is reconstructed in that the nodes and edges are the same but the data gathered by the stream status blocks is also presented. Referring to the stream status block between the kernels 16 and 20, the total run time for the stream status block was 100 cycles and, out of this, there were 83 valid cycles. There were 17 invalid cycles (cycles where no data is transferred) for which on 14 cycles the kernel A 16 was throttling and for three, the multiplexer M was stalling. Neither type 1 nor type 2 flow control violations (to be described below) were seen by the stream status block during the 100 cycles. For the 88 cycles between kernel 18 and multiplexer 20, there were five invalid cycles for which kernel B 18 was throttling for two and the multiplexer M was stalling for three. Again, no flow control violations of type 1 or type 2 were seen.

To understand the operation of the stream status blocks in greater detail, the arrangement of the edges will now be described with reference to FIGS. 5 and 6. FIG. 5 shows a schematic representation of an edge between two kernels 36 and 38. The edge 40 is the physical and logical connection between two connected kernels. An edge therefore includes a combination of flow control signals and a data bus. In this example, a stall signal 42 and a valid signal 44 are provided and a data bus 46 provides a route for data from the kernel A 36 to the kernel B 38. Referring now to FIG. 6, a stream status block 48 is provided having connections to each of the flow control connections 42 and 44 and the data bus 46. By these connections, the stream status block is able to collect the data to enable reconstruction as shown in FIG. 7.

Figure 8:
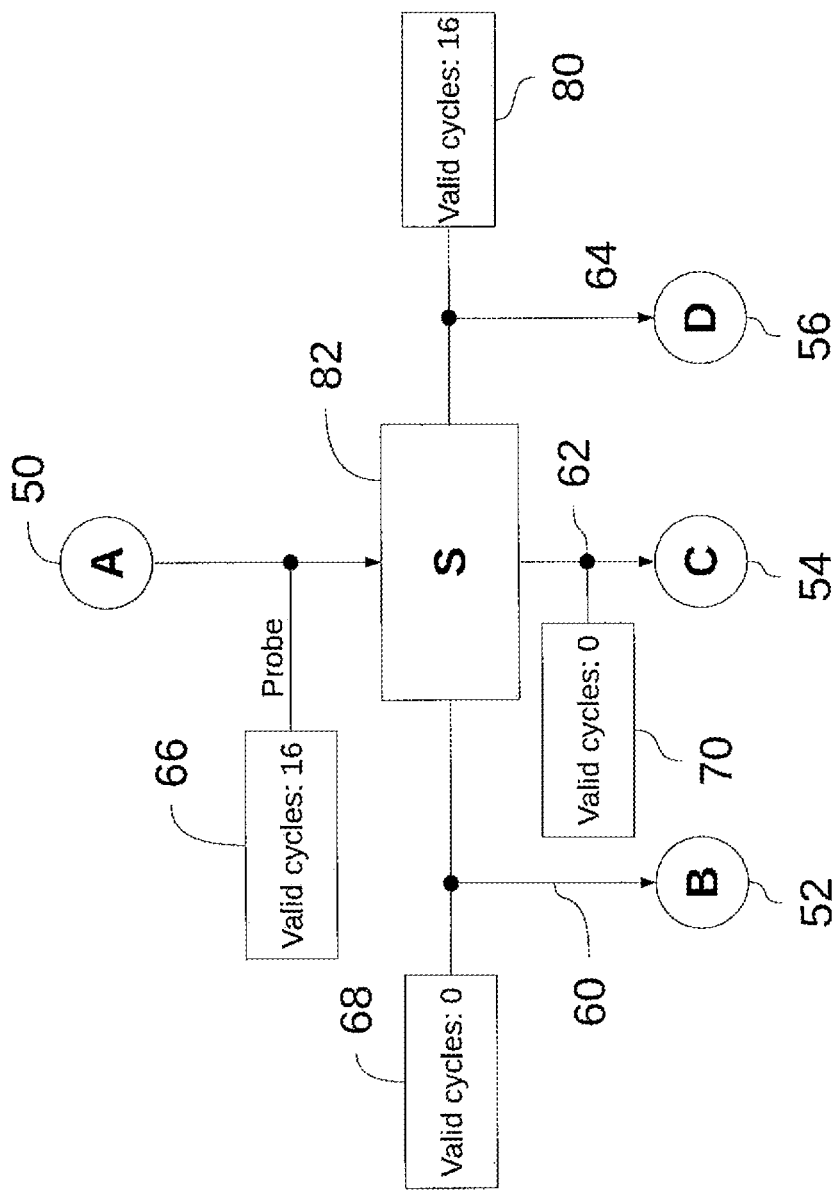
FIG. 8 is a schematic representation of a graph representing a streaming processor including stream status blocks.

By analysis and review of the data collected by the stream status blocks, it is possible to determine useful information regarding the activity within a streaming processor. In the example of FIG. 8, a number of kernels 50, 52, 54 and 56 are connected by edges 58, 60, 62 and 64. Stream status blocks 66, 68, 70 and 80 are arranged connected to edges, 58, 60, 62 and 64, respectively. Kernel 82 is, in this case, a switch S. The stream status blocks with collected data provide an insight into the path that data actually took when it passed through the streaming processor. It is clear from this example that given that there are 16 valid cycles between kernels 50 and 82, and 16 valid cycles between kernels 82 and 56, but no valid cycles between either kernels 52 and 54 and the switch 82 that the data passing through switch 82 from kernel A 50 continued into the kernel D 56.

Figure 9:
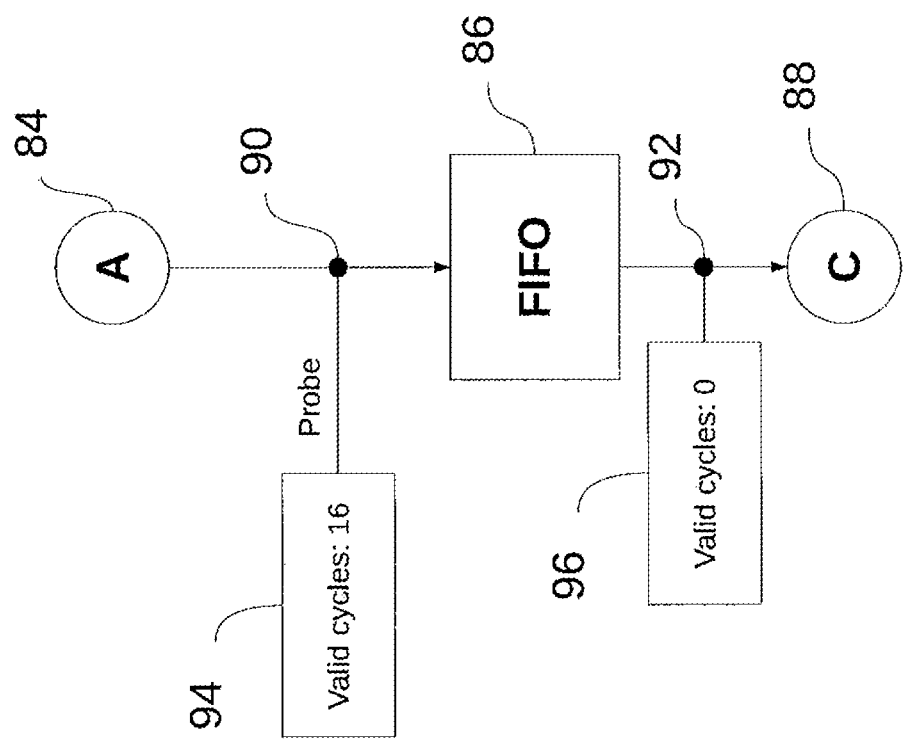
FIG. 9 is a schematic representation of a graph representing a streaming processor including stream status blocks.
Figure 10:
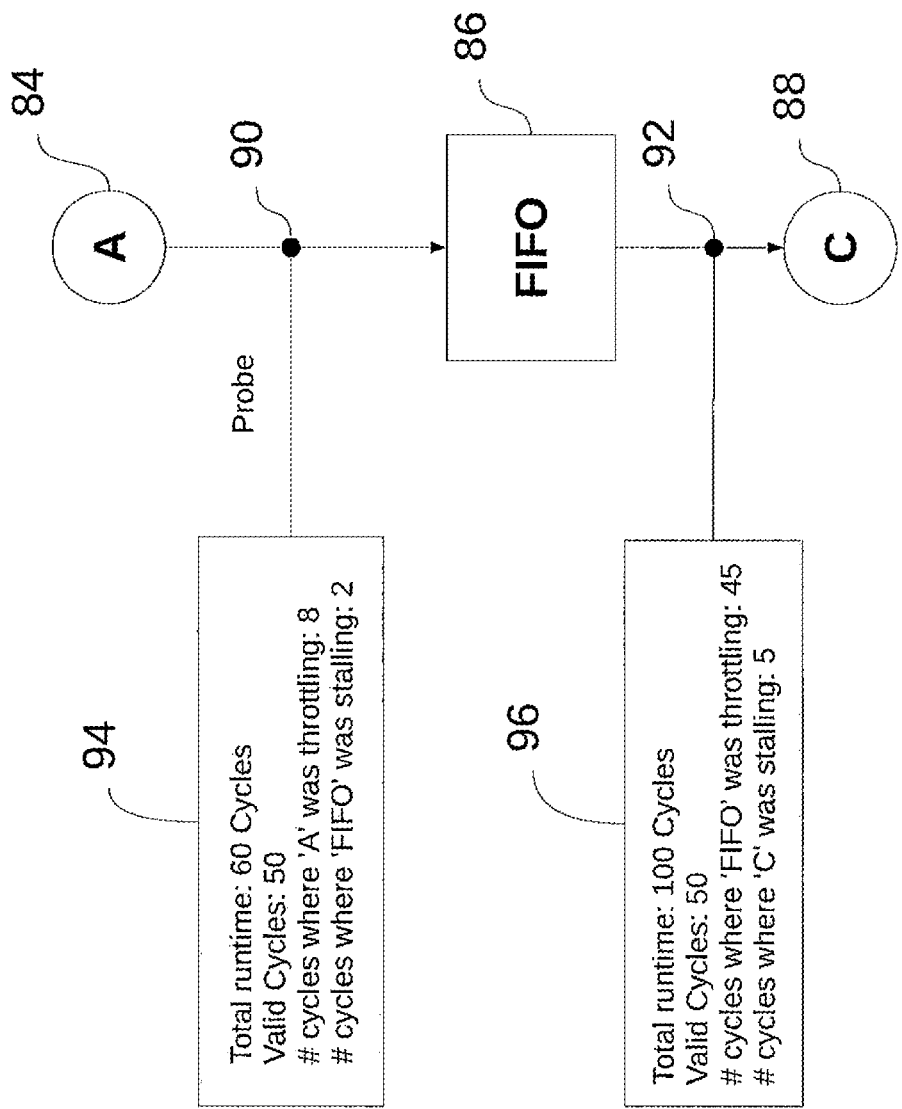
FIGS. 10 and 11 are schematic representations of the graph of FIG. 9 including detailed views of the outputs of stream status blocks.

FIGS. 9 and 10 show another example of the use of stream status blocks. In this example, stream status blocks are used to provide insight into misbehaving nodes or kernels. The stream status blocks are able to provide insight in terms of data swallow, over-producing or wrong switching. In FIG. 9, three kernels 84, 86 and 88 are connected in series with edges 90 and 92. Stream status blocks 94 and 96 are connected to edges 90 and 92, respectively. The valid cycle count from stream status block 94 with respect to edge 90 is 16 whereas the valid cycle count from stream status block 96 with respect to edge 92 is zero. Since the kernel 86 is a FIFO this indicates that the node is misbehaving since the FIFO should have passed through all data but clearly did not. In other words, the FIFO 86 is "swallowing" data.

FIG. 10 shows a further example of a similar arrangement. However, in this case the stream status blocks provide more information enabling the actual efficiency of the streaming processor to be evaluated. Looking at the example of FIG. 10, it can be seen that kernel A 84 provided all the data it could in the first 60 cycles, whereas it took the FIFO 95 cycles to output the same amount of data. Kernel C 88 was responsible for only five cycles of throttling. Therefore, it can be concluded that for the period that the stream status blocks were monitoring the FIFO was not performing as fast as it could. Thus, by analysis of the data generated by the stream status blocks, the efficiency of the processor can be evaluated.

Figure 11:
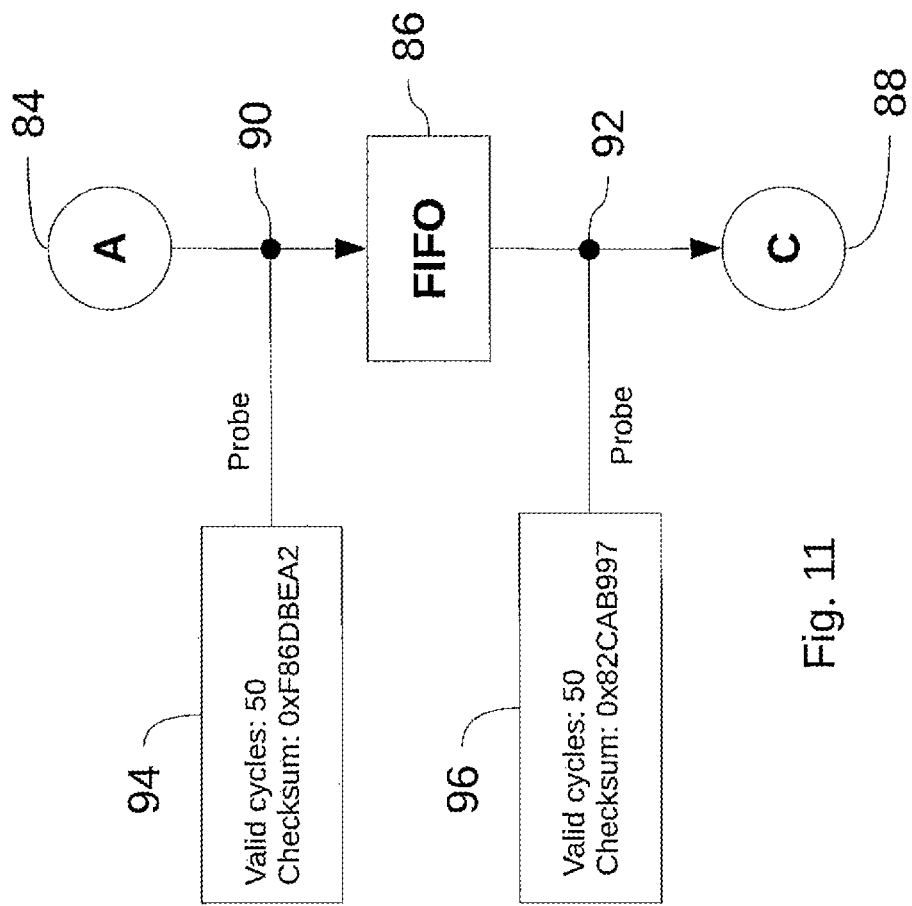

FIG. 11 shows a further example of the operation of a stream status block. In this case, the stream status block provides a checksum value of the data passing along the edge 90 between kernel 84 and FIFO 86. Similarly, a checksum is generated by the stream status block 96 on the data passing along the consecutive edge 92 between FIFO 86 and kernel C 88. In other words the edge 90 between kernel 84 and FIFO 86 and the edge 92 between FIFO 86 and kernel C 88 can be referred to as consecutive edges. Since a FIFO should not modify data that passes through it, it is easy to spot when there is an error or fault with the FIFO due to the change in checksum value. Thus, by comparing the checksum value provided by the two stream status blocks 94 and 96, it is easy to identify whether or not a FIFO has introduced errors into data passing through it.

Figure 1:
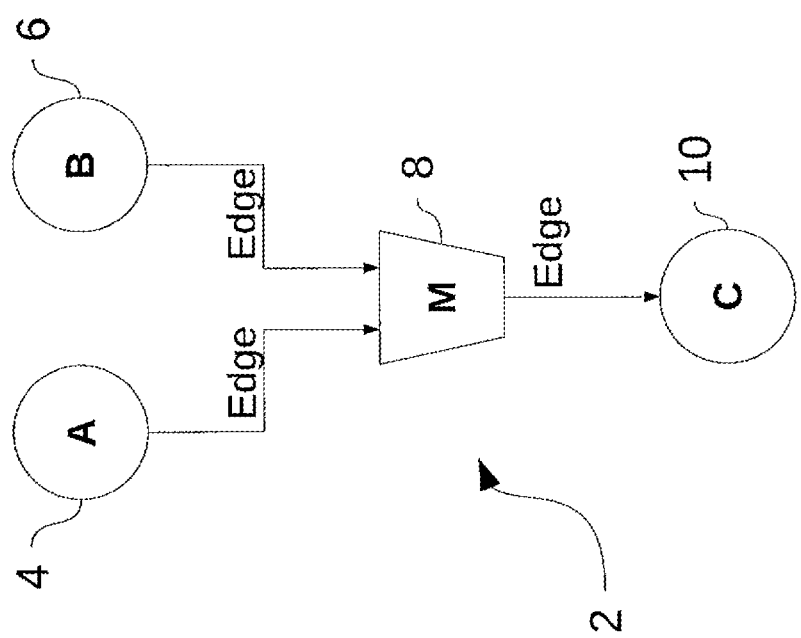
FIG. 1 is a schematic representation of a graph representing a streaming processor.
Figure 2:
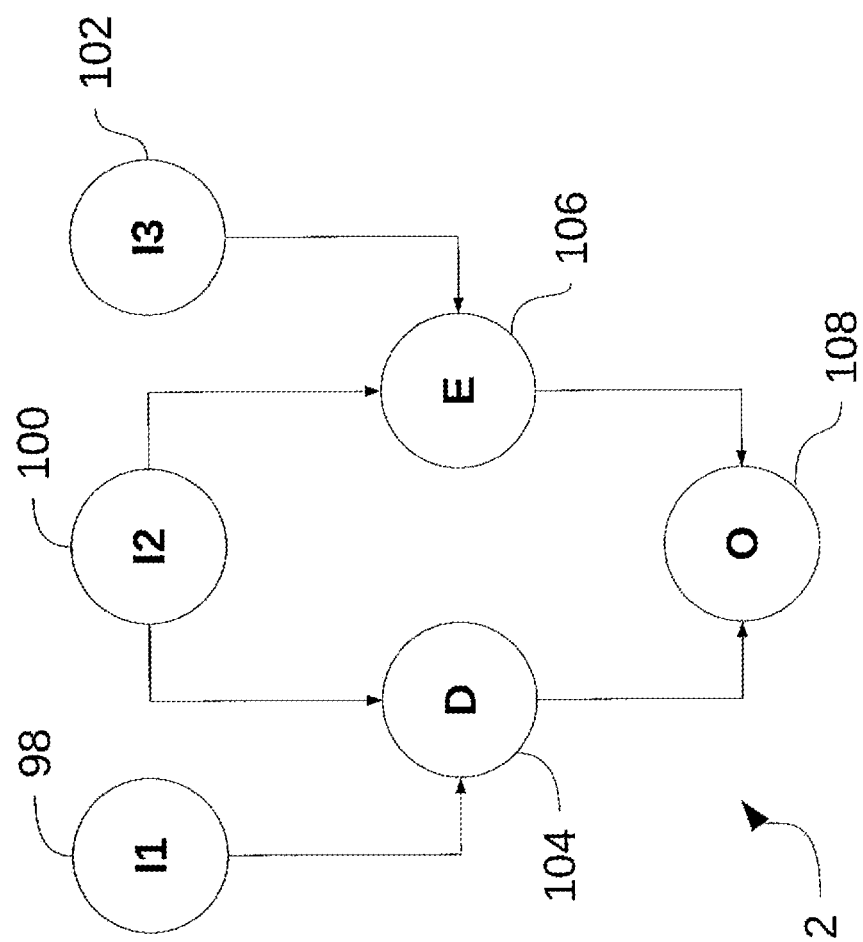
FIG. 2 is a schematic representation of a graph representing a streaming processor.
Figure 12:
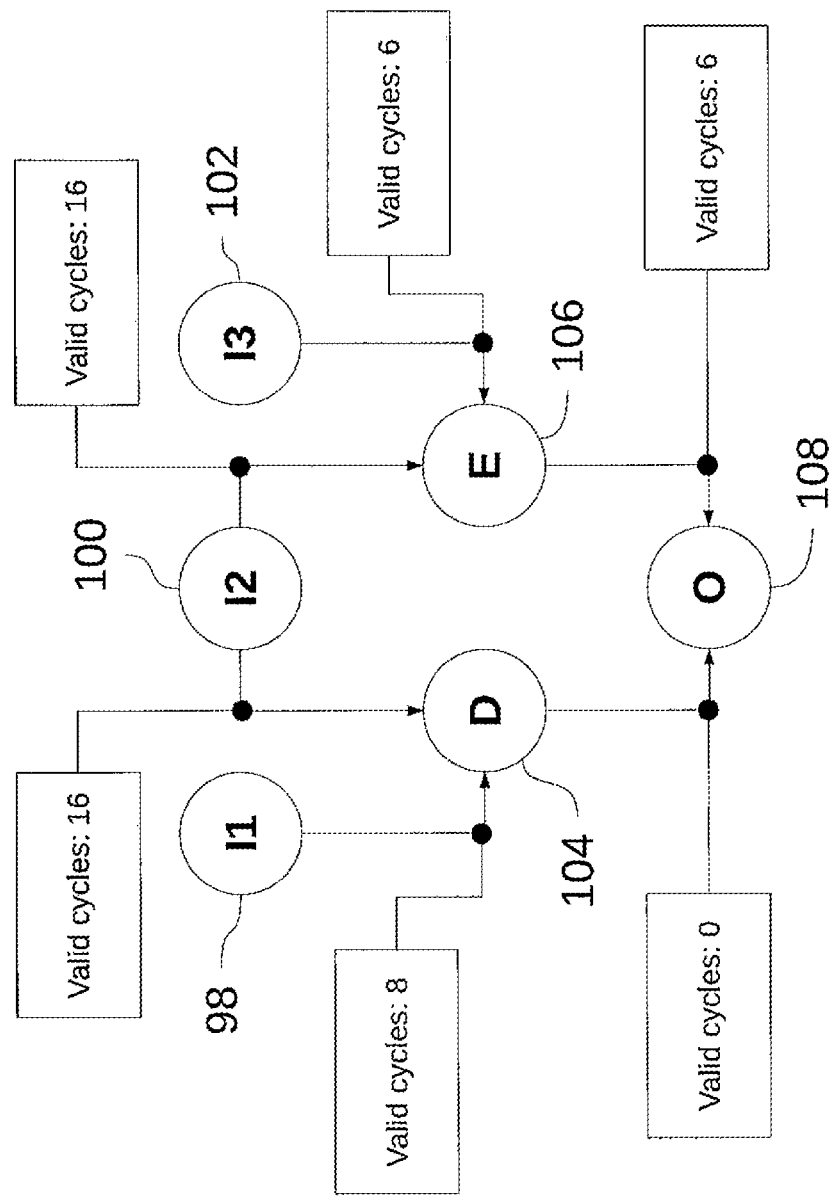
FIG. 12 is a schematic representation of the graph of FIG. 2 including stream status blocks.

Considering, for example, the streaming processor of FIG. 2, a number of input kernels 98, 100 and 102 are provided and arranged connected via various edges eventually (through other kernels 104 and 106) to an output kernel 108. If the output kernel 108 does not produce any output data, it can be impossible easily to tell which of the kernels upstream is responsible for this. With the use of stream status blocks, it is possible to observe the state of the data flow and therefore diagnose the problem. As shown in FIG. 12, stream status blocks are provided to determine the number of valid cycles on each of the edges within the processor. As a processor designer, it is possible to know how many valid cycles should be expected for a given input. In the present example, kernel D is expected to output eight data items. There ought, therefore, be eight valid cycles on the edge between kernels 104 and 108. The stream status block 110 coupled to this edge in fact, shows zero valid cycles. Therefore, kernel 104 is where debugging investigations would commence.

Figure 13:
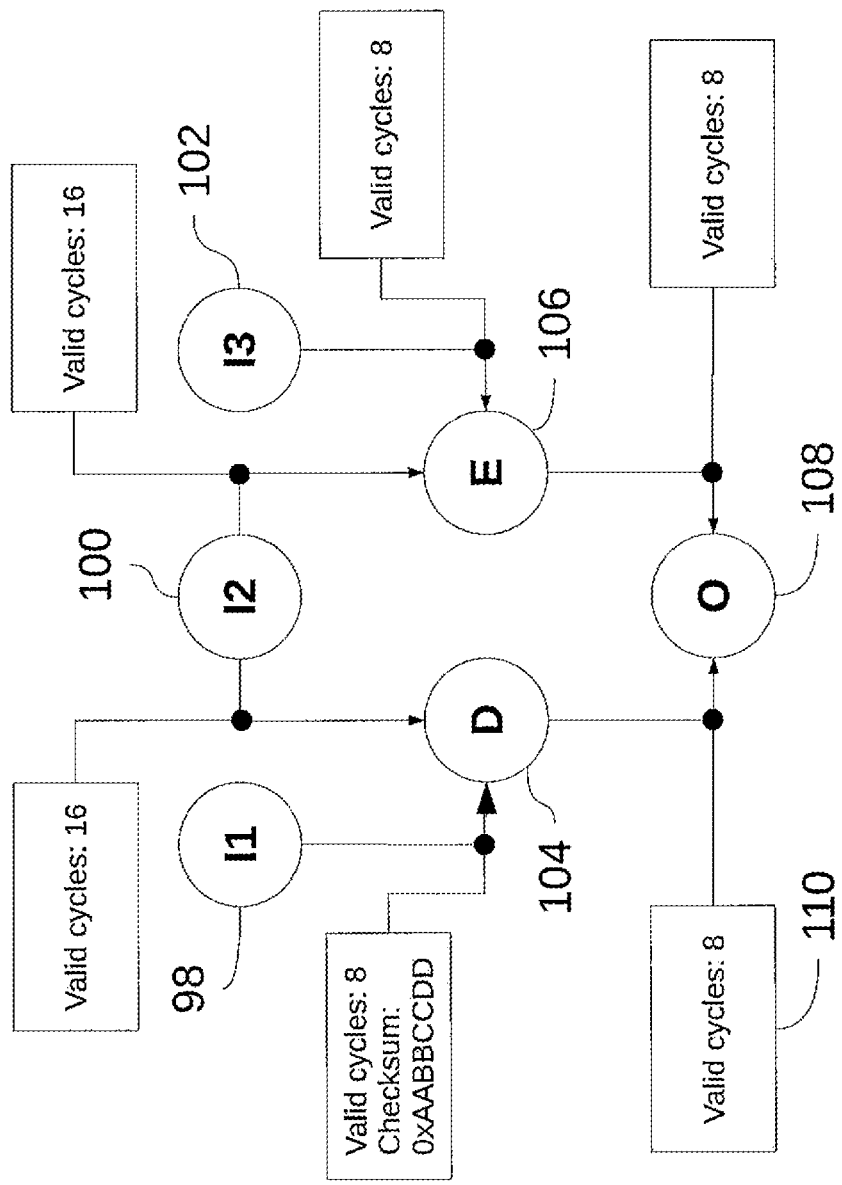
FIG. 13 is a schematic representation of the graph of FIG. 12 including a more detailed view of the stream status blocks.

FIG. 13 shows the same basic streaming processor as in FIG. 12. However, in this case, the valid cycle count from stream status block 110 is eight. The basic problem of no valid cycles appearing on an edge no longer applies. It is still necessary to determine if the kernels are operating correctly.

The use of a checksum within the stream status block enables this problem to be solved by calculating a checksum value for the data stream passing through the processor at each edge. Since a process designer will typically know the checksum value to expect, it is possible to find data corruptions using simple comparisons, i.e., comparing the determined value with the expected value. In FIG. 13, as the user streamed data in to kernel 98 the expected check sum value on this edge is known and can be compared with the value recorded by the stream status block.

Figure 14:
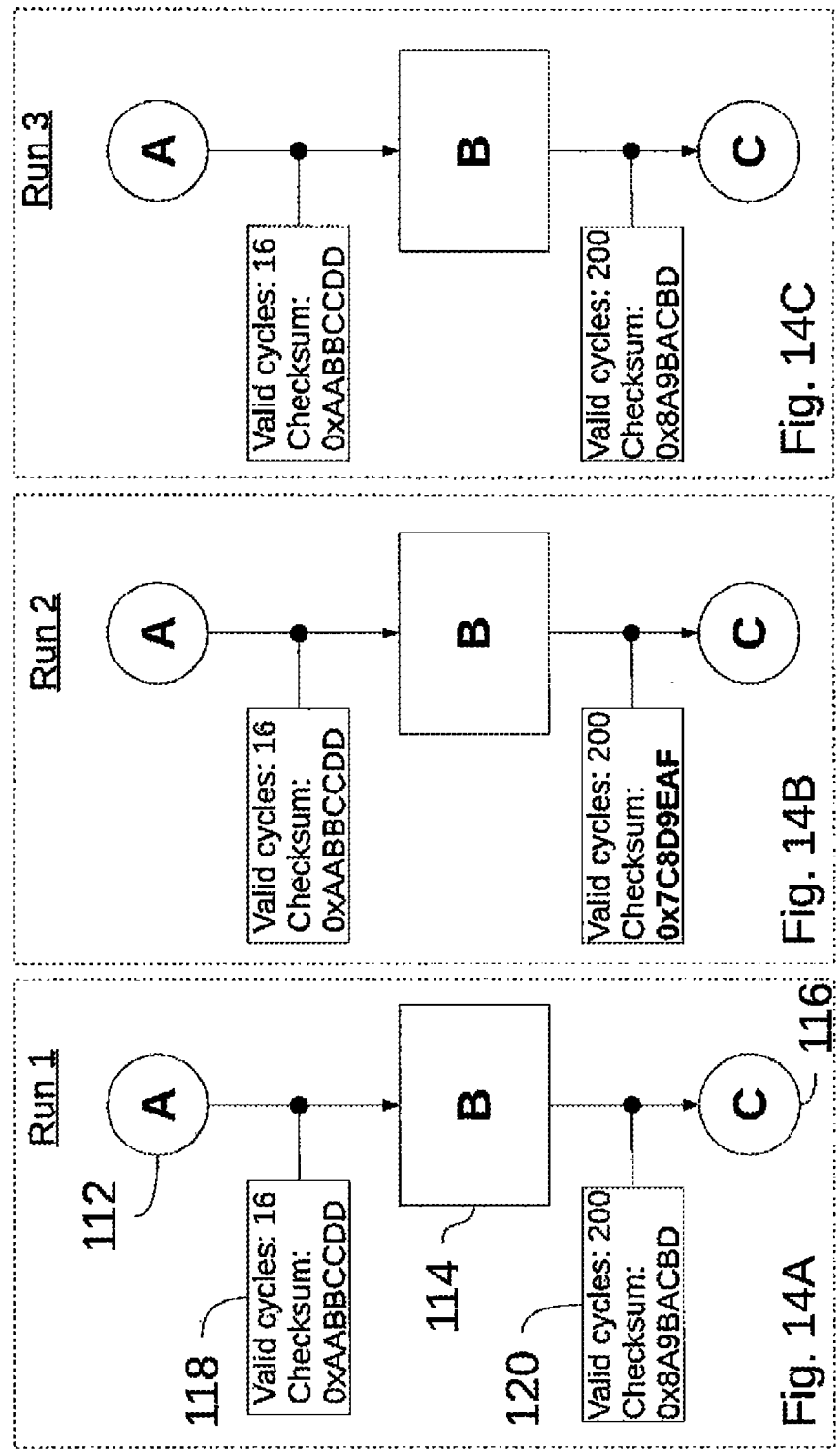
FIGS. 14A to 14C are schematic representations of various data runs within a streaming processor represented as a 3 node graph.

In a further example, check sums may be calculated on plural or even all of the edges of a streaming processor. This means that if there is intermittent data corruption it is possible to detect where it occurred by streaming the same input data multiple times. FIGS. 14A to 14C show an example of this. In this case, a simple streaming processor design comprises three kernels 112, 114 and 116. Stream status blocks 118 and 120 are provided on the edges connecting the various kernels. As can be seen, the check sum value is different in run 2 (FIG. 14B) as compared to that in each of runs 1 and 3 (FIGS. 14A and 14C). Thus, it appears likely that the kernel B 114 is intermittently corrupting data.

Considering the function and effect of stream status blocks, it is clear that there are significant distinctions as from known means for monitoring data flows. Considering, for example, use of a known system observation bus, the use of stream status blocks is beneficial in that there is no change to the routing of data. In other words, the flow control pattern of the stream is unchanged and means that it is possible simply to reconstruct the flow graph of a stream status processor using data accumulated by the stream status blocks. No routing or re-routing of data is required with the use of stream status blocks since they simply monitor data passing along the normal established edges within a streaming processor.

In another known method, cyclic redundancy checks are performed on FIFOs within a programmable logic device. Using such an arrangement, the method for detecting data corruption inside a FIFO is provided by calculating CRC values on the input and output of the FIFO and then comparing them. In contrast, the use of streamed status blocks with checksums provides a more general implementation of this functionality. In other words, the FIFO is merely a node or kernel on the data flow graph but could have been any other node as well. Thus, stream status blocks provide a generalised approach for calculating checksums on any edge of a data flow graph and are not limited to a specific node type like SRAM.

Figure 15:
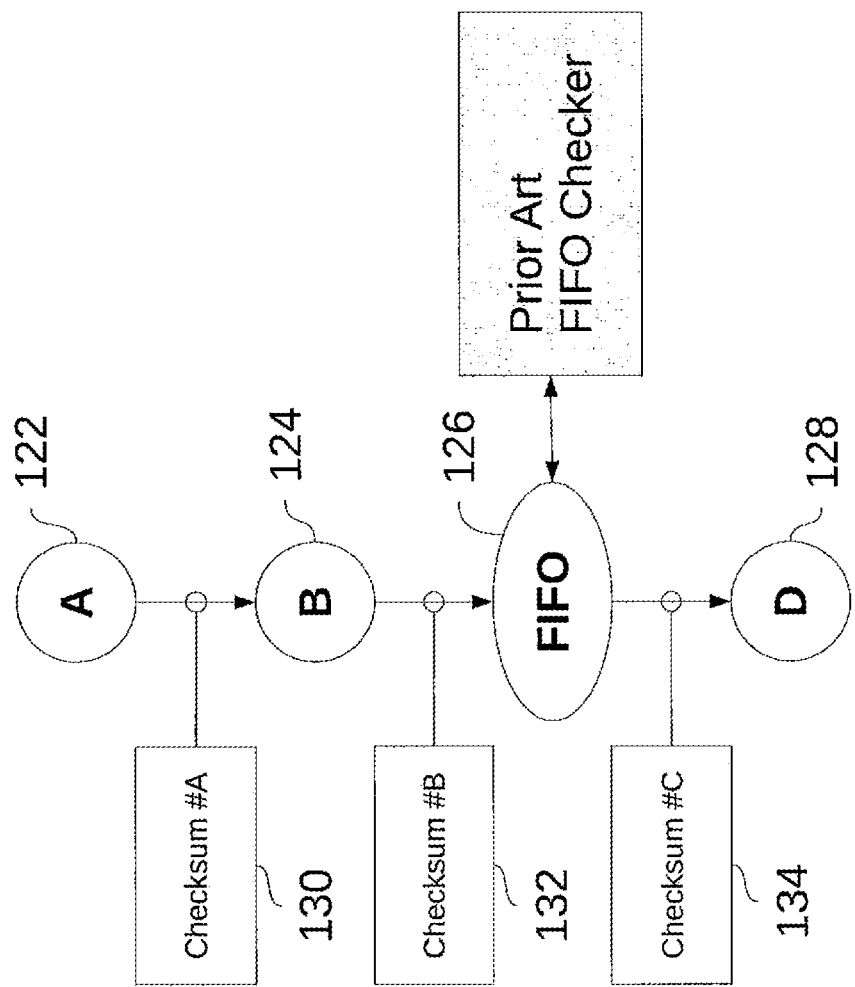
FIG. 15 is a schematic representation of a graph representing a streaming processor including stream status blocks and a known FIFO checker.

Stream status blocks can be automatically inserted into any edge of the data flow graph and are not kernel-type specific. Clearly, the numbers that the stream status block outputs makes sense when considered in the context of the kernel that the stream status block is attached to. FIG. 15 shows a schematic representation of a streaming processor comprising kernels 122, 124, 126 and 128. Kernel 126 is a FIFO. Stream status blocks 130, 132 and 134 are provided. Their function, as described above, is to determine checksum values along the edges between the various connected pairs of kernels. In contrast, where a known FIFO checker would be used, this is specific to a FIFO and does not provide the general ability to monitor and model data flow within a streaming processor.

Figure 16A:
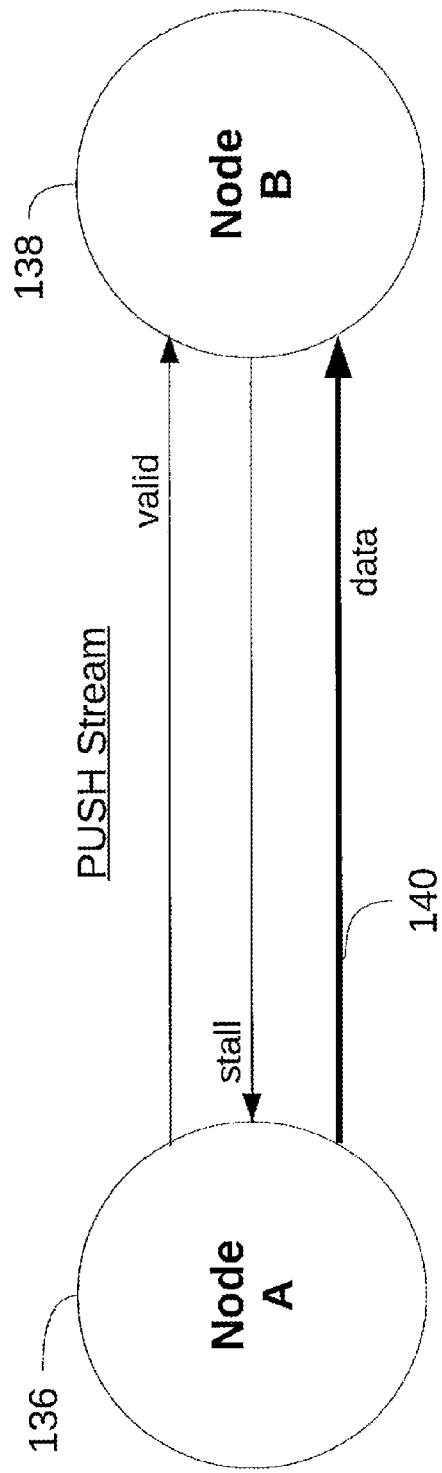
FIGS. 16A and 16B show schematic representations of graphs representing a streaming processor comprising 2 nodes and arranged to demonstrate the data and control connections between the nodes using each of two flow control methodologies.
Figure 16B:
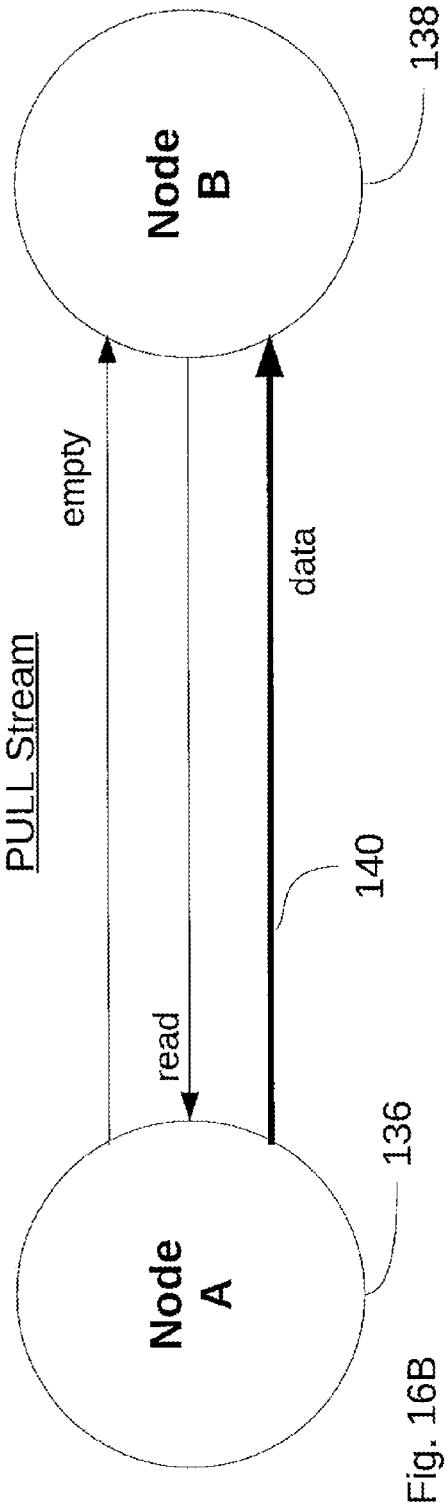

FIGS. 16A and 16B show examples of the flow control methodologies that would typically be used within a streaming processor. Two kernels are provided with data flowing from first node A 136 to second node B 138. A data flow 140 is therefore provided irrespective of the flow control methodology. FIG. 16A shows an example of a push stream flow control methodology in which "valid" and "stall" flow control signals are used to control data flow between the kernels. When the valid flow control signal is asserted, data is defined as transferring from kernel A 136 to kernel B 138. If kernel B cannot accept new data, it asserts the "stall" signal and valid will therefore stop after a number of cycles defined as the stall latency (SL).

In FIG. 16B, a pull stream control flow methodology is utilised. In this case, data is defined as transferring or moving from kernel A 136 to kernel B 138 exactly RL (real latency) cycles after the read flow control signal has been asserted. If kernel A 136 has no more data to transfer, it will assert an empty signal and the read signal will then de-assert EL cycles afterwards (Empty Latency). The manner in which the stream status blocks are coupled to these inter-kernel connections will now be described with reference to FIGS. 17 and 18.

Figure 17:
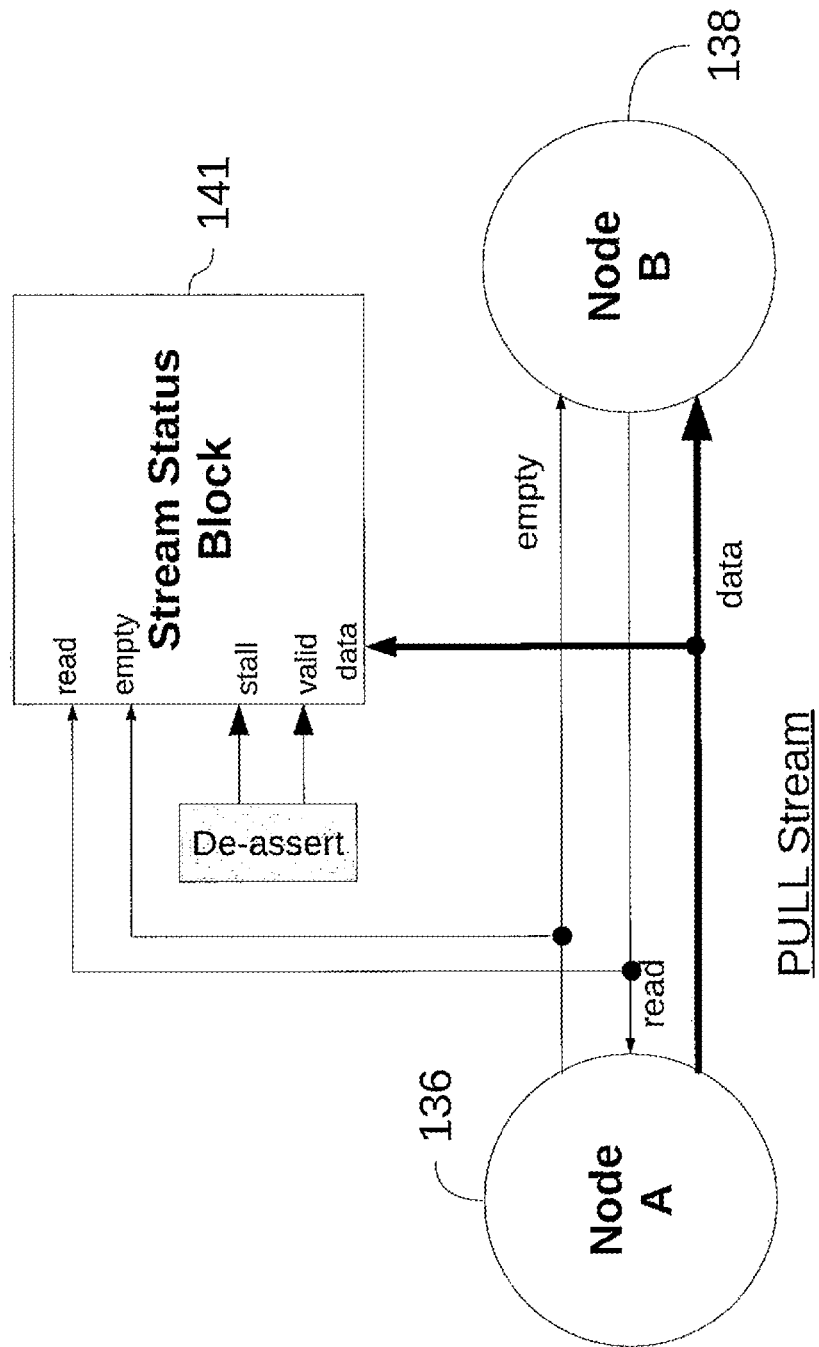
FIGS. 17 and 18 show the connections between the data and control paths between the nodes in the graphs of FIGS. 16A and 16B and stream status blocks.

In FIG. 17, the connections between a stream status block and the edge are shown for the PUSH stream control stream methodology. In this example, the stream status block 140 has inputs from the stall and valid signals and also from the data stream as the data bus itself. A de-assert signal may be hard-wired into read and empty inputs on the stream status block 140 since they are not required when a PUSH stream flow control methodology is utilised.

Figure 18:
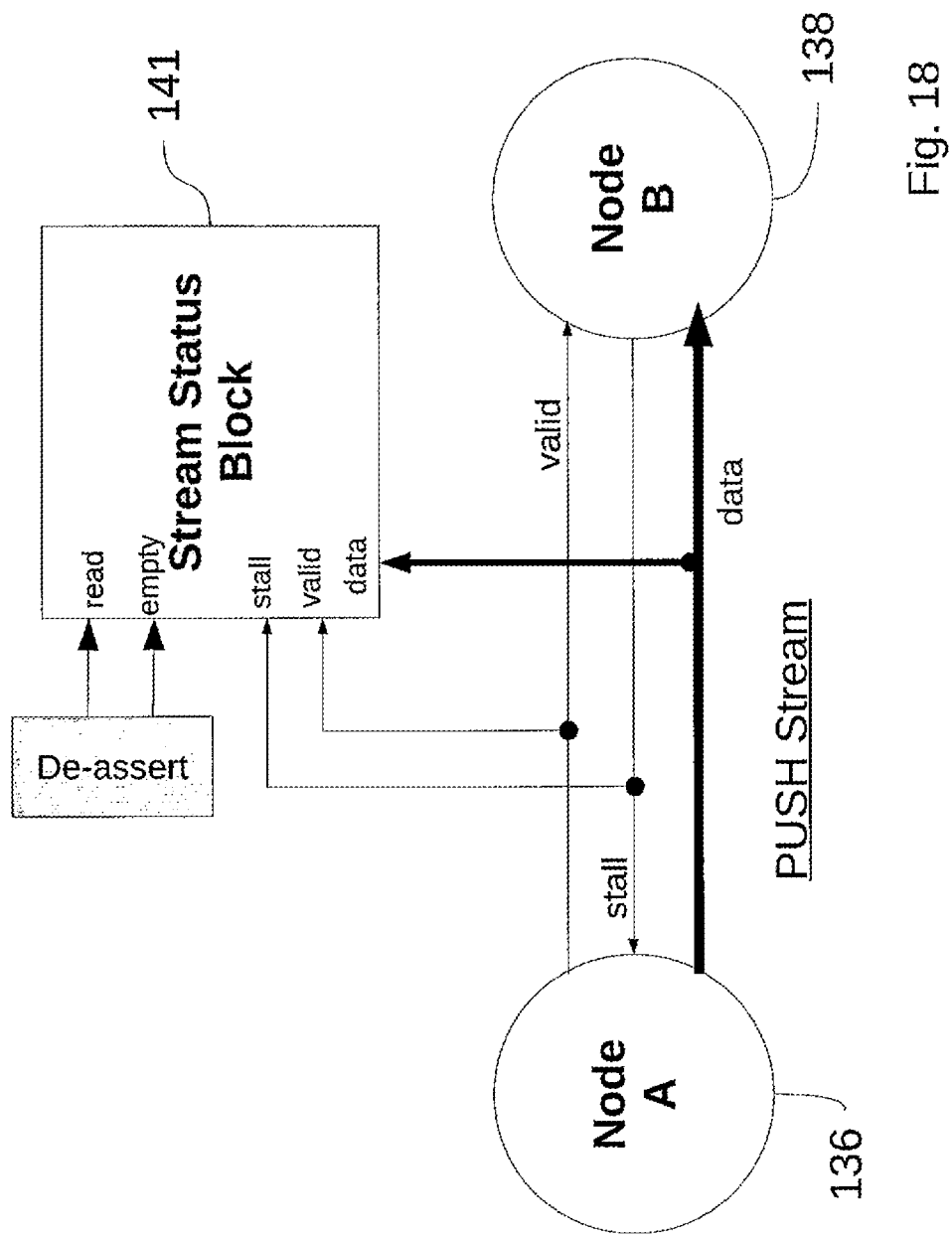

In the example of FIG. 18, the connections for a stream status block 140 are shown when a PULL stream flow control methodology is utilised. As can be seen, in this case, the read and empty signals are connected to corresponding inputs on the stream status block as is the data. Stall and valid inputs are de-asserted.

Figure 23:
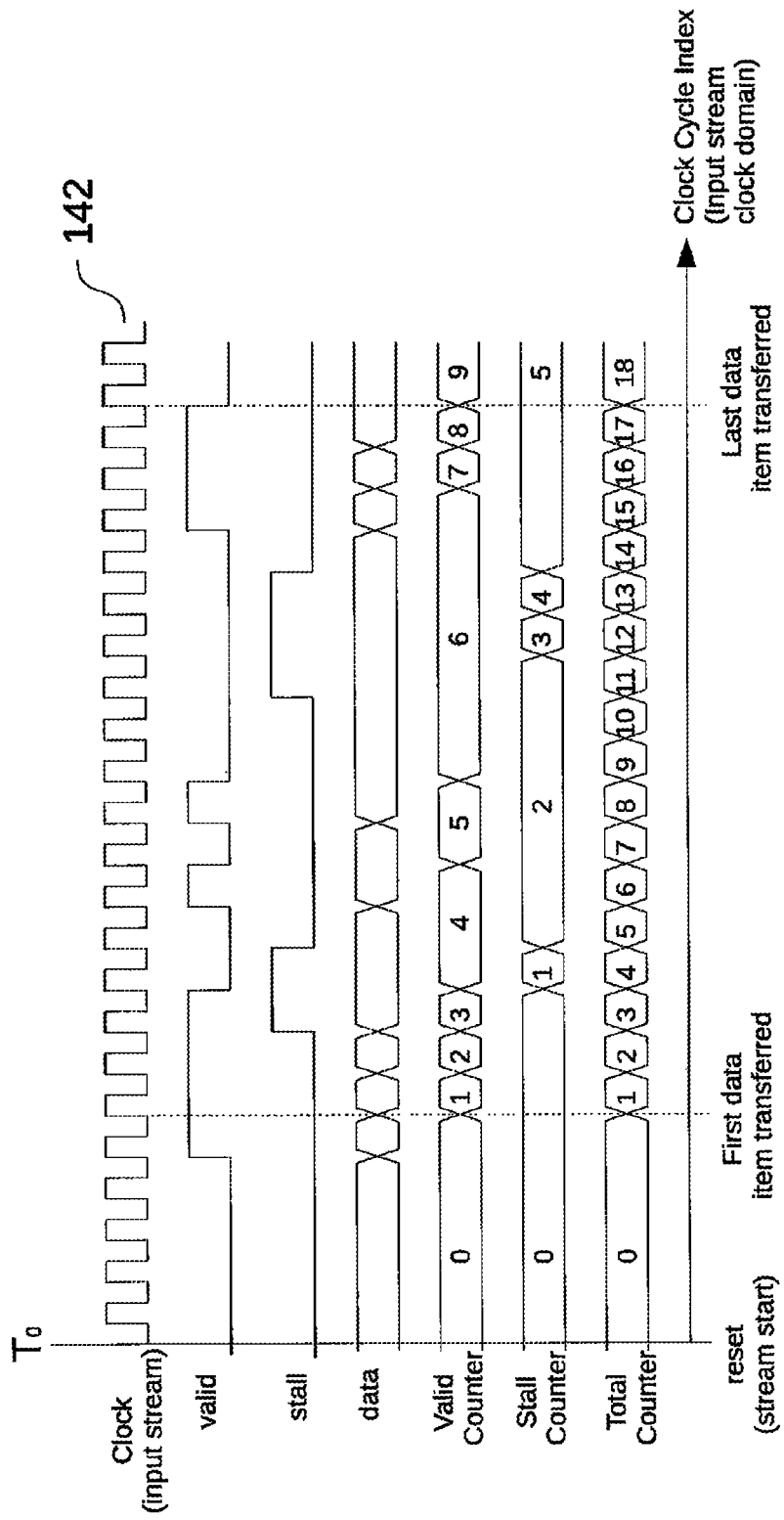
FIG. 23 is a timing diagram of a stream status block with its counters in operation.

To provide a more detailed understanding of the operation of a stream status block, reference is now made to FIG. 23 which shows a timing diagram for data signals between two kernels when operating as a PUSH stream. A clock 142 defines the clock domain for the input data stream. Initially, at time T0 valid and stall are both de-asserted.

The stream status block is required to provide an accurate picture of how data moves inside the data flow graph, i.e., between kernels and along the edge connecting the kernels in question. This will enable reconstruction of the data flow graph. Therefore, it is preferably arranged to provide values from three cycle counters: a valid counter, a stall counter and a total counter.

FIG. 23 shows the behaviour of each of these counters. When an analysis of the streaming processor is required, the counter values can be read back from the hardware through some known mechanism. In one example, the counter values are exposed using readable registers.

Figure 24:
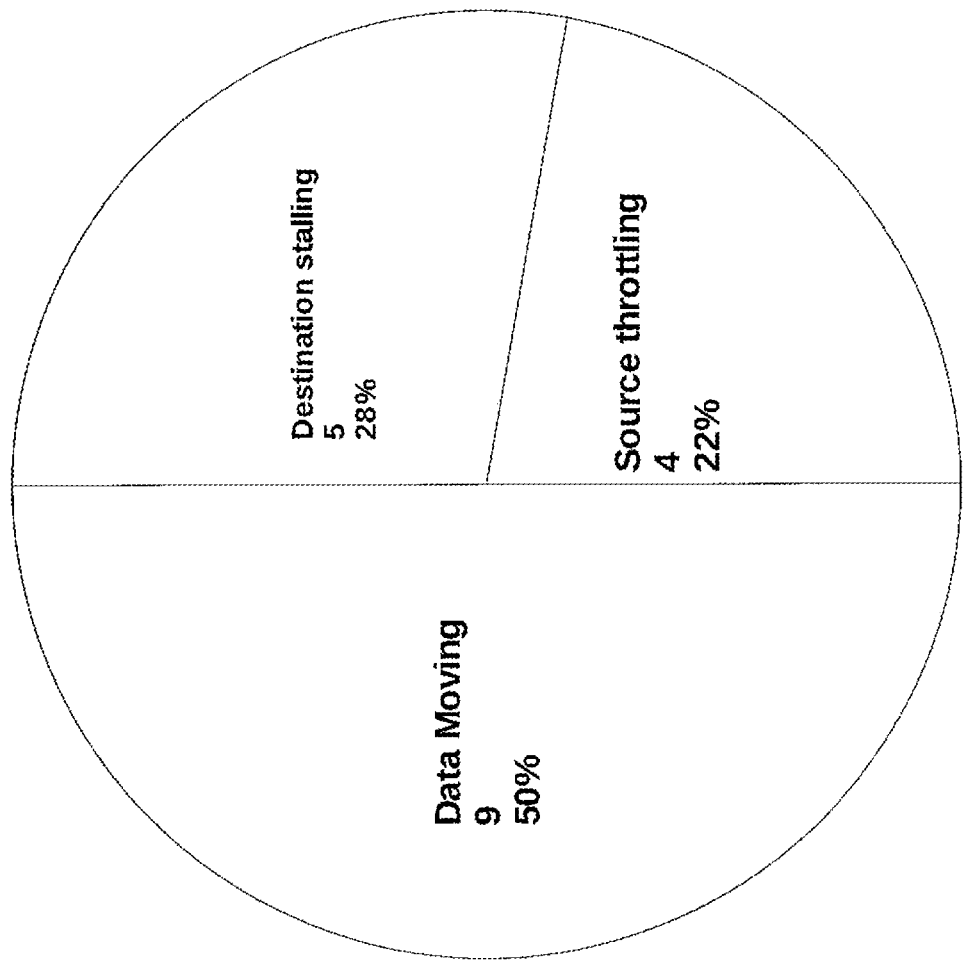
FIG. 24 is a representation of a streaming processors performance using a pie chart.

As a PUSH stream, the valid counter represents the number of data items moved. The stall counter represents the number of cycles that the destination was stalling. The time the source node was throttling is derived by subtraction of the valid counter from the total counter. Thus, the present stream's performance can be represented in a pie chart as shown in FIG. 24.

As can be seen, the stream was running for a total of 18 cycles, as derivable from the fact that the value for the total counter was 18. Nine of the 18 cycles had data moving as demonstrated by the fact that the value of the valid counter is nine. On five cycles, the data was stalled by the destination and the remaining were therefore throttled by the source. Thus, by the simple use of valid, stall and total counters, it is possible to determine the operation of the flow control and data flow along the edge between the respective kernels.

Figure 21:
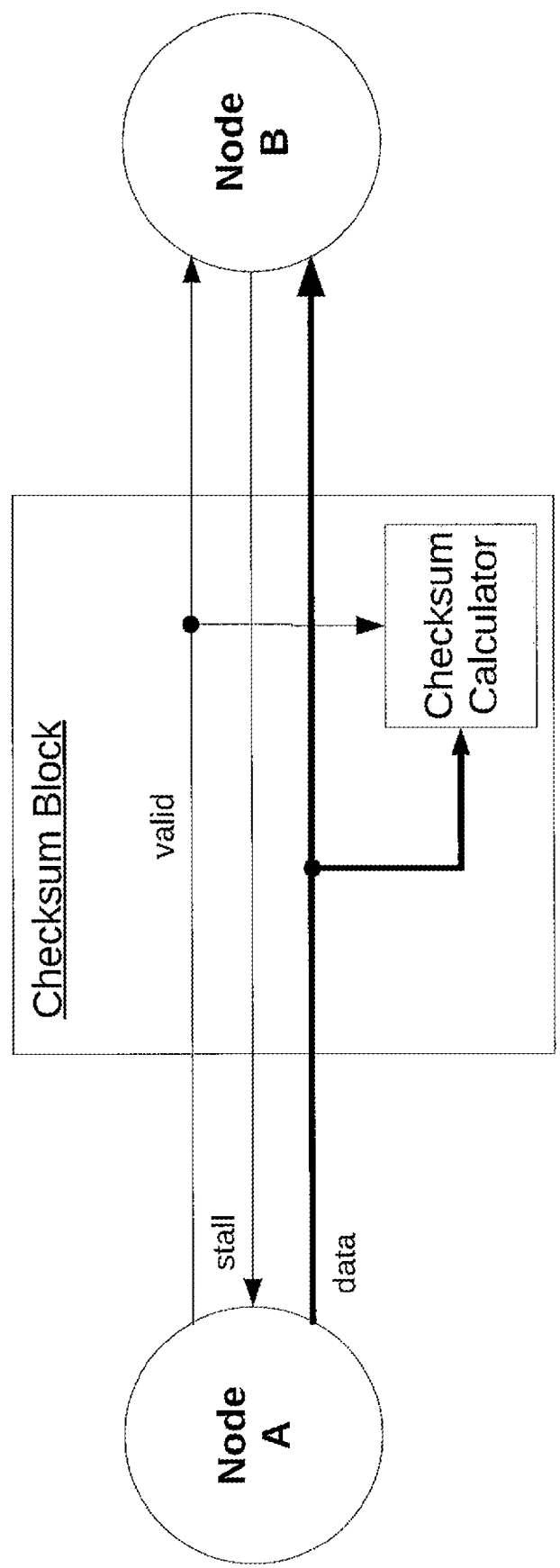
FIGS. 21 and 22 show schematic representations of graphs representing a streaming processor comprising 2 nodes and arranged to demonstrate the data and control connections between the nodes.

Last, with respect to stream status blocks, FIG. 21 shows an example of a checksum calculator wiring inside a stream status block. Stream status blocks are not limited to a specific checksum algorithm. However they are mostly suited for algorithms which can be applied to data streams. In the present example, when a valid signal is asserted, the checksum calculator recognises this and determines a checksum based on the data passing along the data bus. When the valid signal is de-asserted the checksum calculated is, effectively, turned off. There would at this point be no data passing along the data bus.

Considering now a further aspect of the present method and apparatus, the concept of a counterizer block will now be described in detail. As explained above, a counterizer block is hardware attached to an edge (within the manager) at the output of a kernel and is controlled to replace the output data from the kernel with known data but to maintain precisely the same data flow, i.e., stall pattern, as the original output. This means that the pattern of data flowing from the kernel in question is not changed, but the actual values of the data are at known levels. This enables any unexpected variations in subsequent outputs from the streaming processor to be identified and de-bugged as appropriate.

Referring to FIG. 19, an example of a streaming processor including a counterizer is shown. The processor includes kernels 144, 146 and 148. A counterizer 150 is provided between the first and second kernels 144 and 146. The counterizer enables it to be known exactly when a node has started to consume data and what part of the data was output. In the example of FIG. 19, the kernel B 146 is a FIFO. Assuming it has been determined that there is a problem with the FIFO using stream status blocks as described above, it is still not possible to know which data items are missing. In particular, it is desired to know if a first, last or middle data item is missing from the output from the FIFO 146. The counterizer 150 serves to inject known data values into the FIFO 146. The data output from the FIFO 146 is then observed and it can be seen at what stage the operation of FIFO B 146 is failing. With the counterizer block 150, there is a guaranteed input to FIFO 146 so it is possible to calculate what to expect at the output from the FIFO. Table 1 below shows an example of a data capture window, both with and without the counterizer block.

of events happens. Without following the exact flow pattern behaviour of the upstream kernel, it is most likely that the error that is being debugged will not be triggered.

Figure 20A:
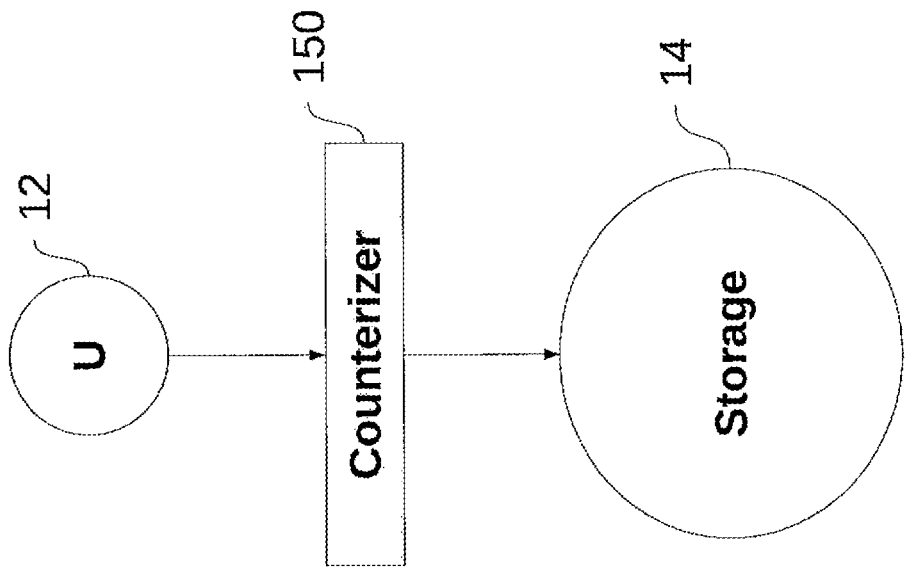
Figure 3:
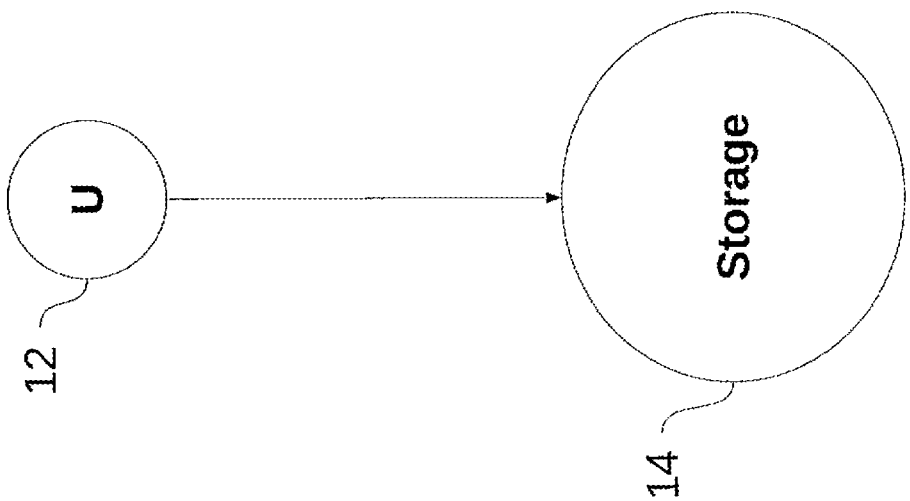
FIG. 3 is a schematic representation of a graph representing a streaming processor, comprising a single node arranged to output data to memory.
Figure 20B:
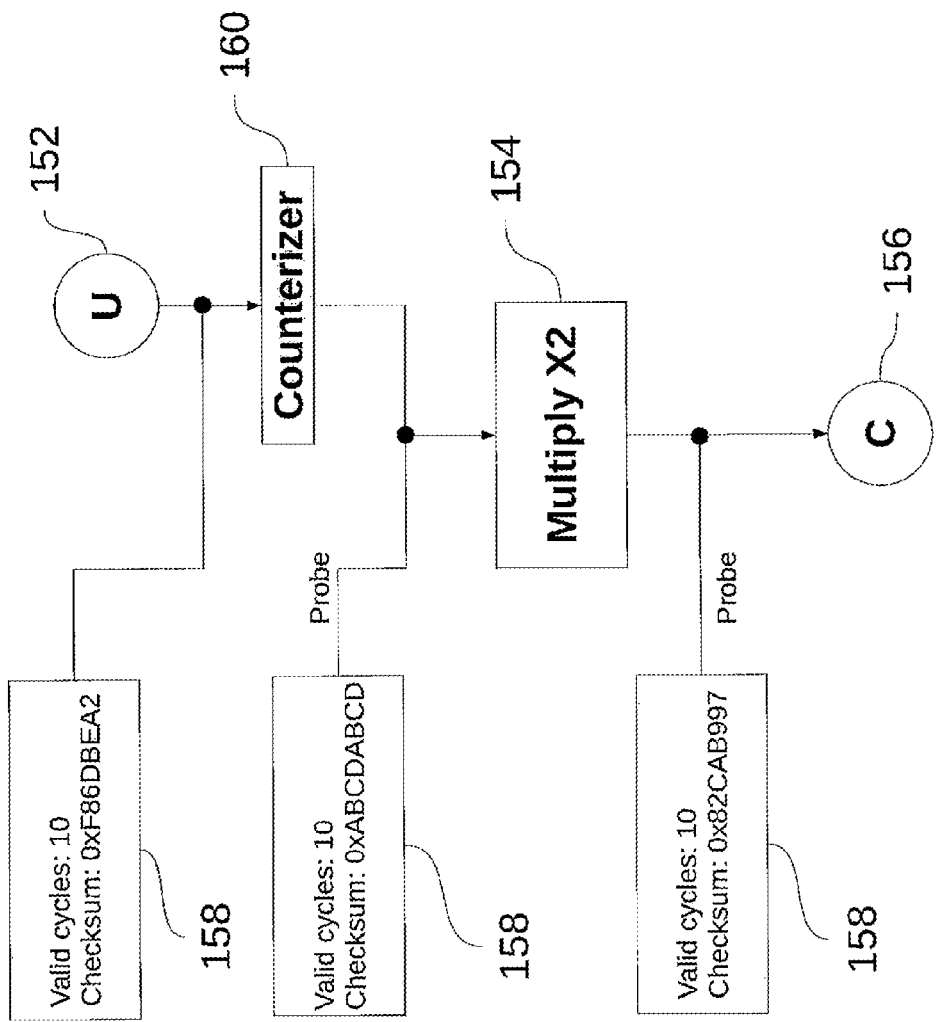

FIG. 20B shows a further example of a data flow graph including a counterizer 160. In this example, a kernel 152 is arranged to provide an output to a further kernel 154 which is, in turn, connected to kernel 156. Stream status blocks 158 are provided connected to the various edges within the data flow graph. A counterizer 160 is provided arranged to receive the output from the kernel U 152 and provide a counted input stream to the kernel 154. In other words, the counterizer block 160 attaches to the output of the kernel 152 and replaces the output data with known data, i.e., a count. Since the counterizer block 160 always outputs known data values, it is possible to calculate what checksum to expect at the output of the "multiply×2" kernel 154, and indeed verify that this is in fact the value that came out of this kernel.

The combination of the use of a counterizer 160 with the stream status blocks 158 enables easy and convenient checking of the data flow graph and debugging, if necessary.

Figure 22:
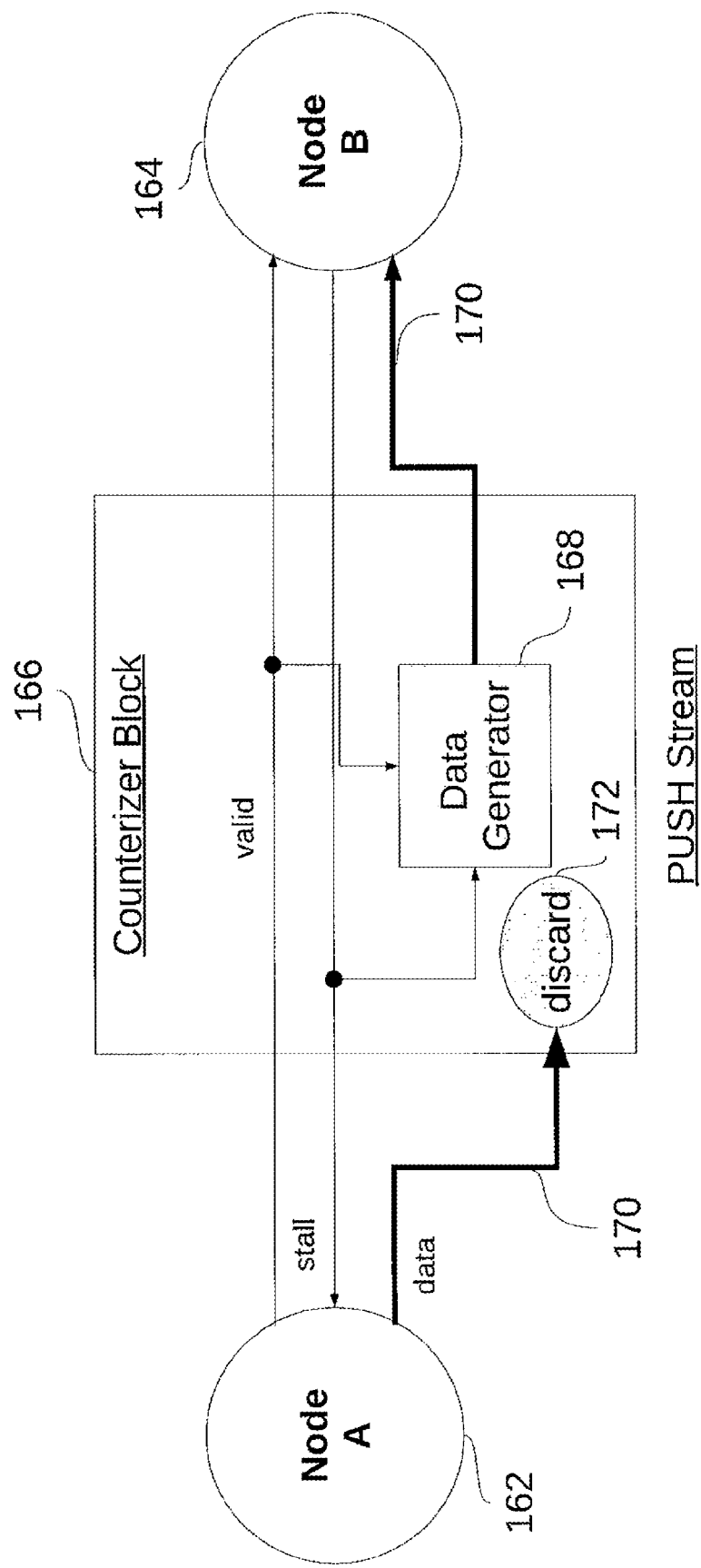

FIG. 22 shows a schematic representation of how a counterizer block would typically be wired into a streaming processor. As can be seen, in this case, there are two kernels provided, an input kernel 162 and an output kernel 164. These are typically any kernels within a streaming processor. A counterizer block 166 is coupled to the lines between the kernels 162 and 164. The wiring of the connection between the counterizer block and the kernels 162 and 164 is clearly shown. As can be seen, the counterizer block 166 includes a data generator 168 arranged to receive input from each of the valid and stall connections between the kernels 162 and 164.

Thus, by receiving inputs from the flow control messages going in both directions between the kernels, the data generator is able to emulate the exact data flow pattern between the kernels. The actual data bus 170 between the kernels 162 and 164 is broken by the data generator such that data output from the kernel 162 is discarded within the counterizer block 166.

| Without Counterizer | 0xA7 | 0xA7 | 0xA7 | 0xA7 | 0xA7 | 0xA7 | 0xA7 | 0xA7 | 0xA7 | 0xA7 |
|---|---|---|---|---|---|---|---|---|---|---|
| With Counterizer | 16 | 17 | 18 | 19 | 20 | 21 | 22 | 23 | 24 | 25 |

As can be seen, the data captured at the output from B has started with the value 16, indicating a problem with the first data items (prior to 16) that were streamed into B. Thus the use of a counterizer, presents a simple and robust means by which the effective operation of kernels within a streaming processor can be determined.

FIG. 20A shows a further example of a streaming processor including a counterizer. In this example, as explained above, it would always have been possible to inspect the content of storage 14 to determine exactly what has been written to it. However without knowing exactly what data was written from kernel 12, it is difficult to arrive at any conclusions. In other words, it is difficult to know whether the errors in writing data storage 14 have arisen due to the writing process or due to the data output from kernel 12 itself.

In this example, counterizer 150 serves to provide a counter data stream which is written to storage 14 and thereby enables a user to inject known data into the storage and therefore to know what to expect when the storage is examined. It is significant that the counterizer block 150 maintains the same flow pattern as the kernel 12, only substituting the data, as usually, errors will only be triggered when a certain sequence Thus, the flow control signals are passed through so as to provide precise flow-control pattern preservation.

It can be seen then that counterizer blocks provide a way of injecting known data into any point of the data flow graph while maintaining exact flow control patterns. Maintaining the same flow control patterns can be crucial to reproducing problems and thereby enabling their identification and debugging. Having known data makes debugging significantly more efficient as errors can easily be spotted and it can similarly be easily determined how the problem that is being debugged affects data. In contrast to known attempts at providing means for diagnosing problems within streaming processors and debugging them, a counterizer block replaces the data whilst maintaining data flow patterns.

Thus, the present applicant has recognised that it is important to maintain data flow patterns whilst the values of the data themselves can, at times not be important. Thus, in embodiments described herein, actual data is replaced with a counter that is implemented whenever the flow control signals indicate that data should transfer. The counterizer block therefore operates on the same clock domain as the input stream which enables control flow patterns to be maintained. Furthermore flow control signals themselves are passed through the counterizer block without interference. Whereas the example of FIG. 22 is for a PUSH stream control flow methodology, it will be appreciated that a similar arrangement can be used for a PULL stream control flow methodology.

The present method and apparatus provides a useful tool for debugging streaming processors in an efficient and precise manner. Embodiments of the present invention have been described with particular reference to the examples illustrated. However, it will be appreciated that variations and modifications may be made to the examples described and are within the scope of the present invention.

What is claimed is:

1. A method of monitoring operation of programmable logic for a streaming processor, the method comprising:
    generating a graph representing the programmable logic to be implemented in hardware, the graph comprising nodes and edges connecting nodes in the graph;
    inserting, on at least one edge, data-generating hardware arranged to receive data from an upstream node, discard the data values of said received data, and generate new data signals at known values having the same flow control pattern as the received data, for onward transmission to a connected node.

2. The method according to claim 1, in which the data-generating hardware is provided on each edge in the graph.

3. The method according to claim 2 wherein the data-generating hardware is arranged to generate a count signal.

4. The method according to claim 2 wherein each edge comprises a data bus for flow of data and control flow signals for the exchange of control flow information, and wherein the method comprises coupling the data-generating hardware to both the control flow signals and the data bus.

5. The method according to claim 1, the data-generating hardware is arranged to generate a count signal.

6. The method according to claim 5 wherein each edge comprises a data bus for flow of data and control flow signals for the exchange of control flow information, and wherein the method comprises coupling the data-generating hardware to both the control flow signals and the data bus.

7. The method according to claim 6 further comprising incrementing the counter when the flow control signals indicate that data should transfer between the nodes.

8. The method according to claim 1, in which each edge comprises a data bus for flow of data and flow control signals for the transmission of flow control signals, and wherein the method comprises coupling the data-generating hardware to both the flow control signals and the data bus.

9. The method according to claim 8, in which the data-generating hardware is arranged to receive an input from the data bus and to provide as an output a count signal having the same flow control pattern as the data received on the data bus.

10. The method according to claim 1, comprising coupling the control signals to a data generator within the count-generating hardware, and in dependence on the flow control signals generating the count signal.

11. The method according to claim 1, comprising operating the data-generating hardware at the same clock rate as the data received from the upstream node.

12. A streaming processor comprising:
    plural nodes for processing streaming data;
    at least one edge connecting each pair of the one or more nodes;
    data-generating hardware arranged to receive data from an upstream node in a pair of nodes, discard the data values of said received data, and generate new data signals at known values having the same flow control pattern as the received data for onward transmission to a downstream node in the pair of nodes.

13. The streaming processor according to claim 12, in which the data-generating hardware comprises a data generator arranged to generate a count signal.

14. The streaming processor according to claim 12, in which the streaming processor is provided on an FPGA.

15. A tool for enabling the monitoring of operation of programmable logic for a streaming processor, the tool comprising:
    a graph generator for generating a graph representing the programmable logic to be implemented in hardware, the graph comprising nodes and edges connecting nodes in the graph;
    a hardware generator for generating and inserting, on at least one edge, data-generating hardware arranged to receive data from an upstream node, discard the data values of said received data, and generate new data signals at known values having the same flow control pattern as the received data, for onward transmission to a connected node.

* * * * *